(12) United States Patent
Dietenberger et al.

(10) Patent No.: US 10,240,568 B2
(45) Date of Patent: Mar. 26, 2019

(54) MANUALLY ACTUATABLE FEED PUMP AND FUEL SYSTEM WITH A FEED PUMP

(71) Applicant: Andreas Stihl AG & Co. KG, Waiblingen (DE)

(72) Inventors: Michael Dietenberger, Waiblingen (DE); Ulf Bannick, Ahlefeld-Bistensee (DE); Isgard Sabelberg, Stuttgart (DE); Tobias Deigendesch, Backnang (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 286 days.

(21) Appl. No.: 15/376,761

(22) Filed: Dec. 13, 2016

(65) Prior Publication Data

US 2017/0167458 A1 Jun. 15, 2017

(30) Foreign Application Priority Data

Dec. 15, 2015 (DE) ........................ 10 2015 016 484

(51) Int. Cl.
| | |
|---|---|
| *F04B 9/14* | (2006.01) |
| *F02M 59/14* | (2006.01) |
| *F02B 63/02* | (2006.01) |
| *F02M 37/00* | (2006.01) |
| *F02M 37/04* | (2006.01) |

(Continued)

(52) U.S. Cl.
CPC ............. *F02M 59/14* (2013.01); *F02B 63/02* (2013.01); *F02M 37/007* (2013.01); *F02M 37/0029* (2013.01); *F02M 37/046* (2013.01); *F02M 37/06* (2013.01); *F02M 37/16* (2013.01); *F02M 59/42* (2013.01); *F02M 59/464* (2013.01); *F04B 9/14* (2013.01); *F04B 15/00* (2013.01); *F04B 23/02* (2013.01); *F04B 23/06* (2013.01); *F04B 43/02* (2013.01); *F04B 43/06* (2013.01); *F04B 49/08* (2013.01); *F16K 15/025* (2013.01); *F16K 15/026* (2013.01); *F04B 2201/0401* (2013.01)

(58) Field of Classification Search
CPC .. F02M 1/00; F02M 1/16; F02M 1/18; F02M 37/16; F02M 37/007; F02M 59/14; F02M 59/42; F02M 59/46; F04B 9/14; F04B 33/00; F04B 2201/0401; F04B 53/10; F04B 43/02; F04B 23/02; F04B 49/08
USPC ...................................... 417/374; 261/DIG. 8
See application file for complete search history.

(56) References Cited

U.S. PATENT DOCUMENTS

| | | | | |
|---|---|---|---|---|
| 4,589,386 A | * | 5/1986 | Everts ...................... | F02M 1/16 123/179.11 |
| 7,210,441 B1 | * | 5/2007 | Burns .................. | F02D 35/0053 123/179.11 |

(Continued)

FOREIGN PATENT DOCUMENTS

DE     1 781 625     1/1959

*Primary Examiner* — Charles G Freay
*Assistant Examiner* — Thomas Fink
(74) *Attorney, Agent, or Firm* — Gudrun E. Huckett

(57) ABSTRACT

A manually actuated feed pump is provided with a primer bulb to be manually actuated by an operator. The primer bulb has a pump chamber. A travel-controlled valve connects the pump chamber to a fuel line. The travel-controlled valve has a valve member that is moved by an actuation travel of the primer bulb into an open position that opens the travel-controlled valve. A first spring is operatively connected to the valve member and to the primer bulb. The primer bulb acts through the first spring on the valve member.

15 Claims, 4 Drawing Sheets

(51) Int. Cl.
  *F02M 37/06* (2006.01)
  *F02M 37/16* (2006.01)
  *F02M 59/42* (2006.01)
  *F02M 59/46* (2006.01)
  *F04B 15/00* (2006.01)
  *F04B 43/02* (2006.01)
  *F16K 15/02* (2006.01)
  *F04B 23/02* (2006.01)
  *F04B 23/06* (2006.01)
  *F04B 43/06* (2006.01)
  *F04B 49/08* (2006.01)

(56) References Cited

U.S. PATENT DOCUMENTS

| | | | | |
|---|---|---|---|---|
| 2001/0007249 A1* | 7/2001 | Ishikawa | F02M 17/04 | 123/73 AF |
| 2001/0032601 A1* | 10/2001 | Galka | F02B 25/14 | 123/73 A |
| 2002/0158349 A1* | 10/2002 | Osburg | F02M 7/08 | 261/34.2 |
| 2003/0062633 A1* | 4/2003 | Woody | F02M 1/16 | 261/37 |
| 2004/0178520 A1* | 9/2004 | Krlin | F02M 1/16 | 261/35 |
| 2004/0244207 A1* | 12/2004 | Menzel | B25F 5/006 | 30/381 |
| 2012/0097482 A1* | 4/2012 | Miller | F01M 11/0458 | 184/6.4 |
| 2012/0219441 A1* | 8/2012 | Thalmann | F02M 37/16 | 417/510 |
| 2012/0318249 A1* | 12/2012 | Warfel | F02M 1/02 | 123/704 |
| 2013/0146028 A1* | 6/2013 | Layher | F02M 69/54 | 123/457 |
| 2013/0276724 A1* | 10/2013 | Lank | F02M 37/0011 | 123/2 |
| 2013/0340722 A1* | 12/2013 | Osburg | F02M 37/0023 | 123/510 |
| 2014/0026854 A1* | 1/2014 | Lindstrom | F02M 1/16 | 123/437 |
| 2014/0241922 A1* | 8/2014 | Yang | F04B 33/00 | 417/472 |
| 2015/0136252 A1* | 5/2015 | Feulner | F02M 37/0023 | 137/565.11 |
| 2017/0167458 A1* | 6/2017 | Dietenberger | F02B 63/02 | |

* cited by examiner

MANUALLY ACTUATABLE FEED PUMP AND FUEL SYSTEM WITH A FEED PUMP

BACKGROUND OF THE INVENTION

The invention relates to a manually actuatable feed pump, wherein the feed pump comprises a primer bulb for actuation by the operator. The primer bulb has a pump chamber connected by a valve with a fuel line, wherein the valve is travel-controlled and comprises a valve member which can be opened by an actuating movement of the primer bulb.

The invention further relates to a fuel system with a feed pump.

DE 1 781 625 U1 discloses a manually actuatable feed pump which comprises a primer bulb to be actuated by the operator. The primer bulb is coupled with a valve member. Actuating movement of the primer bulb causes opening of the valve member as well as conveyance of fuel due to the reduced volume of the primer bulb.

It is an object of the invention to provide a manually actuatable feed pump with increased feed volume and a reduced size. A further object of the invention resides in providing a fuel system with a feed pump.

SUMMARY OF THE INVENTION

In accordance with the invention, the object is achieved in regard to the feed pump in that the primer bulb acts by means of at least a first spring on the valve member.

In accordance with the invention, the object is further solved in regard to the fuel system in that the pressure in the fuel system amounts to an overpressure of 0 bar to 2 bar relative to ambient pressure.

In regard to the feed pump, it is provided that the primer bulb is acting by at least a first spring on the valve member. The spring between the primer bulb and the valve member effects decoupling of the actuation travel of the primer bulb from the actuation travel of the valve member. The movement of the primer bulb opens first the valve member. Subsequently, the primer bulb can be actuated farther so that the first spring is compressed. In this context, advantageously no further movement of the valve member occurs. Accordingly, the actuation travel that must be provided for the valve member can be comparatively small while the primer bulb can carry out a long actuation travel so that with each pump stroke a comparatively large quantity of fuel can be conveyed. Decoupling of the actuation travel of the primer bulb from the control movement of the valve member by means of the first spring enables therefore in a simple way a long pump stroke while the feed pump has a minimal size.

A simple configuration is achieved when the primer bulb is acting immediately, i.e., without intermediate positioning of further elements, on the first spring. The first spring effects advantageously at the same time a return movement of the primer bulb after actuation. The first spring in this context is advantageously secured against rotation relative to the primer bulb. The anti-rotation fixation of the first spring relative to the primer bulb prevents that the first spring can rotate relative to the primer bulb and thereby mechanically damage the primer bulb. The anti-rotation fixation of the first spring relative to the primer bulb is realized advantageously by means of an intermediate element on which the first spring is supported and which, in turn, is guided relative to the pump housing so as to be secured against rotation. The primer bulb is advantageously secured on the pump housing so as to prevent rotation of the primer bulb. It is particularly advantageous when the first spring is secured against rotation relative to the intermediate element by means of friction and the primer bulb is clamped on the pump housing and, in this way, is also secured by friction forces against rotation.

In the non-actuated state of the primer bulb, the first spring has advantageously a spacing relative to the primer bulb. In this way, the first spring acts on the primer bulb only for returning (restoring) the primer bulb. In the non-actuated state of the feed pump, the force of the first spring is not acting on the primer bulb. Accordingly, a long service life of the primer bulb can be achieved.

A minimal size combined with a large feed volume results when the actuation travel of the primer bulb amounts to at least two times, in particular at least four times, the actuation travel of the valve member. The primer bulb is comprised advantageously of transparent, in particular elastic, plastic material. In this way, the function of the feed pump can be controlled in a simple way by the operator. The operator can determine visually whether there are still gas bubbles in the primer bulb and thus in the fuel system. Preferably, the primer bulb is comprised of an elastomer.

Advantageously, a second spring is acting in the closing direction of the valve on the valve member. Accordingly, a reliable closing of the valve member can be achieved for the non-actuated primer bulb. The spring constant of the second spring is advantageously greater than the spring constant of the first spring. Upon actuation of the primer bulb, the first spring is deformed first. The second spring initially secures the valve in the closed state. Only when the first spring has been deformed by a predetermined actuation travel and the force which is applied by the first spring on the second spring is sufficiently great, the second spring is also deformed and the valve is opened. The spring constant of the second spring amounts advantageously to at least 1.1 times, in particular at least 1.2 times, preferably approximately 1.3 times, the spring constant of the first spring. Advantageously, the spring constant of the second spring is less than two times the spring constant of the first spring. In this way, too great a pressure build-up in the primer bulb is avoided prior to opening of the valve.

However, it may also be advantageous that the spring constant of the first spring is greater than the spring constant of the second spring. In this way, upon actuation movement of the primer bulb, first the second spring is deformed and the valve member opened and the first spring is deformed only upon further actuation movement. In particular in case of a comparatively small spring constant of the second spring, a spacing between the first spring and the primer bulb in the non-actuated state of the primer bulb is advantageous. Since the primer bulb has a spacing relative to the first spring, it is ensured that the primer bulb in the non-actuated state cannot exert a force on the first spring to thereby deform the second spring and open the valve member. Accordingly, a reliable closing of the valve member is ensured even for a comparatively small spring constant of the second spring.

A simple configuration is achieved when the valve member is secured on an intermediate element. The intermediate element is advantageously arranged between the first spring and the second spring. On one side of the intermediate element, the first spring is thus arranged and on the other side of the intermediate element the second spring is arranged. The first spring and the second spring are supported advantageously on the intermediate element in this context. The first spring and the second spring are supported in particular immediately on the intermediate element, respectively, so that no further components are required and a simple configuration results. The intermediate element is designed preferably as a plate.

The intermediate element comprises advantageously at least one through passage. The through passage connects the pump chamber with a chamber that is formed between the intermediate element and the pump housing. Advantageously, the valve opens into the chamber that is formed between the intermediate element and the pump housing. By means of the through passage, liquid from the pump chamber can flow into the chamber that is formed between the intermediate element and the pump housing and from there can flow through the open valve into the fuel line. In the same way, flow occurs in opposite direction from the fuel line into the pump chamber.

The outer diameter of the intermediate element can advantageously be comparatively large so that the first spring on the intermediate element can be designed with a large outer diameter and can be supported on the intermediate element. Since the intermediate element comprises through passages, the intermediate element can be guided with its outer circumference near the pump housing or the primer bulb because no passage of liquid is required in this area. This provides for a compact configuration.

The intermediate element is advantageously arranged in a receptacle that is embodied on the pump housing. The wall which forms the receptacle is resting advantageously against the inner side of the primer bulb. In this way, a good fixation of the primer bulb on the wall of the receptacle and an increase of the stability of the primer bulb by the wall are achieved. The receptacle can serve at the same time for guiding the intermediate element. Preferably, the intermediate element is secured against rotation in the receptacle. This is advantageously achieved by an appropriate guiding action of the intermediate element in the receptacle.

In an alternative embodiment, the through passages can be provided on the exterior of the intermediate element. The through passages can be, for example, designed as recesses or the like on the outer circumference of the intermediate element. By means of the at least one recess on the outer circumference of the intermediate element, advantageously a guiding action of the intermediate element relative to the pump housing can be realized. This is in particular advantageous in case of a plurality of recesses distributed about the circumference of the intermediate element.

The first spring is in particular a pressure spring. Advantageously, the outer diameter of the first spring decreases from the intermediate element toward the crest of the primer bulb. The geometry of the first spring advantageously follows the geometry of the primer bulb. In this context, an approximately conical or dome-shaped form of the pressure spring can result. The first spring can be a conical pressure spring, for example. Since the outer diameter of the pressure spring decreases, the pressure spring can be compressed to a comparatively great extent. At the same time, in the area adjacent to the intermediate element, the pressure spring can be designed with comparatively large outer diameter. Since the first spring has a comparatively minimal outer diameter in the area of the crest of the primer bulb, the first spring can project to a point near the crest of the primer bulb. In this way, a complete return (restoring) of the primer bulb can be ensured. A residual depression in the area of the crest of the primer bulb can be prevented.

The feed pump conveys the fuel into a fuel line. The fuel line is advantageously connected to the pump chamber by means of at least one connecting opening controlled by the valve. The at least one connecting opening forms in this context the inflow opening into the pump chamber as well as the outflow opening from the pump chamber. Through the connecting opening, the fuel can thus flow in both directions. In this way, a simple configuration is achieved. The connecting opening opens into the fuel line advantageously at a location between two check valves that determine the flow direction in the fuel line. In this context, the check valve arranged at the suction side opens in flow direction toward the connecting opening and the check valve arranged on the pressure side opens advantageously in flow direction away from the connecting opening. Since the check valves are arranged in the fuel line and not at the connecting opening, as is the case in pressure-controlled valves, the check valves can be designed to be relatively large and therefore have a simple and robust configuration. The check valves only determine the flow direction and must not determine an opening pressure so that the check valves can be designed without pre-tensioning spring.

For a fuel system with a feed pump it is provided that the pressure in the fuel system amounts to an overpressure of 0 bar to 2 bar relative to ambient pressure. The fuel pressure in the fuel system is therefore comparatively low.

Advantageous embodiments may result by any combination of individual elements of the embodiments.

One embodiment of the invention will be described in the following with the aid of the drawings.

DESCRIPTION OF THE PREFERRED EMBODIMENTS

Figure 1:
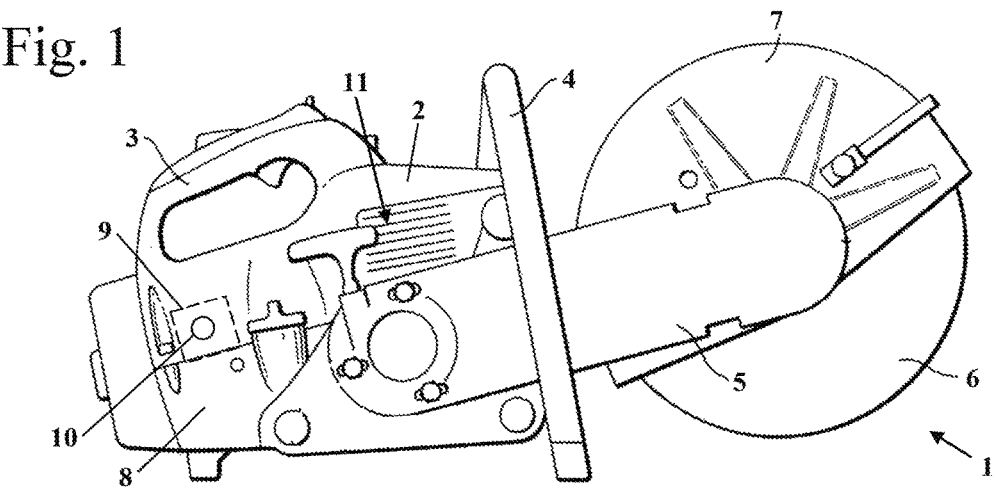
FIG. 1 is a schematic side view of a cut-off machine with a fuel pump.

FIG. 1 shows an embodiment of a motor-driven hand-guided power tool in the form of a cut-off machine 1. Instead of a cut-off machine 1, the invention can also be used with other hand-guided power tools such as motor chainsaws, trimmers, hedge trimmers, lawnmowers or the like. The cut-off machine 1 comprises a housing 2 on which a grip 3 as well as a grip pipe 4 for guiding the cut-off machine 1 in operation are secured. In the embodiment, the grip 3 is designed as a top grip but a different arrangement of the grip 3 can be advantageous also. On the housing 2, a cantilever arm 5 is secured; at the end which is facing away from the housing 2, a cut-off wheel 6 is rotatably supported on the cantilever arm 5. The cut-off wheel 6 is covered about a portion of its circumference by a protective cover 7. In the cantilever arm 5, advantageously a belt drive is arranged by means of which the cut-off wheel 6 is driven in rotation. An internal combustion engine 11 is arranged in the housing 2 as a drive. The internal combustion engine 11 is in particular a single cylinder engine, preferably a two-stroke engine, preferably a two-stroke engine to which the fuel is supplied by a fuel valve at low pressure, or a mixture-lubricated four-stroke engine. For supplying the internal combustion engine 11 with fuel, a fuel pump 9 is provided which conveys fuel from the fuel tank 8 to the internal combustion engine 11. After a shut-down of the internal combustion 11, fuel may have drained from the fuel system or vapor bubbles may have formed in the fuel system in particular due to exhaust heat of the internal combustion engine 11. In order to facilitate restarting the internal combustion engine 11, a manually actuatable feed pump 17 (FIG. 2) is provided on the fuel pump 9. The primer bulb 10 of the feed pump 17 projects away from the housing 2 and can be compressed several times by the operator prior to starting the internal combustion engine 11 in order to prime the fuel system with fuel and to flush out vapor bubbles.

Figure 2:
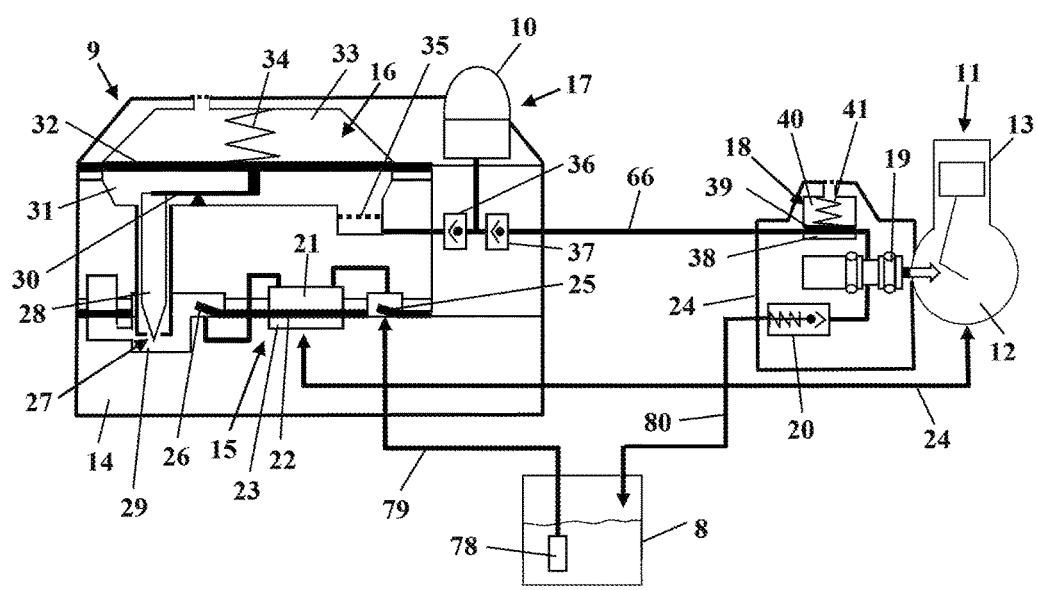
FIG. 2 is a schematic illustration of the fuel system of the cut-off machine of FIG. 1.

FIG. 2 shows schematically the configuration of the fuel system. In the fuel tank 8, a suction head 78 is arranged by means of which the fuel is sucked into a fuel line 79. The fuel line 79 opens into an operating pump 15. The operating pump 15 is driven by the fluctuating pressure in the crankcase 12 of the internal combustion engine 11 and conveys therefore in operation fuel to the internal combustion engine 11. The operating pump 15 has a pump chamber 21 having at its inlet a first check valve 25 and at its outlet a second check valve 26. The pump chamber 21 is delimited by a pump diaphragm 22. The pump diaphragm 22 separates the pump chamber 21 from a back chamber 23 which is connected by a vacuum line 24 with the interior of the crankcase 12. As the pressure fluctuates in the crankcase 12, the pump diaphragm 22 is deflected back and forth and sucks in the fuel through the check valve 25 into the pump chamber 21 as the volume of the pump chamber increases and forces the fuel out of the pump chamber 21 via the check valve 26 as the volume of the pump chamber 21 decreases.

Downstream of the check valve 26, an inlet valve 27 is arranged by means of which the fuel flows into the control chamber 31 of a pressure controller 16. The inlet valve 27 comprises a control valve 28 that opens and closes an inlet opening 29. The control valve 28 is coupled with a lever 30 arranged in the control chamber 31; in the embodiment, the lever 30 is supported with one end on the control valve 28 and with the other end on a control diaphragm 32. The control diaphragm 32 delimits the control chamber 31 on one side. The control diaphragm 32 separates the control chamber 31 from a back chamber 33. In the embodiment, the back chamber 33 of the pressure controller 16 is loaded with ambient pressure. However, a different reference pressure for the back chamber 33 can also be advantageous. The control diaphragm 32 is pretensioned by a first pretensioning spring 34 which is arranged advantageously in the back chamber 33. The pressure controller 16 controls the pressure of the fuel downstream of the pressure controller 16 to a constructively predetermined control pressure of the pressure controller 16. When the pressure in the control chamber 31 drops below the predetermined control pressure of the pressure controller 16, the inlet valve 27 opens the inlet opening 29 and fuel conveyed by the operating pump 15 is conveyed under pressure into the control chamber 31. As soon as the pressure in the control chamber 31 has risen to the pressure which is predetermined by the pressure controller 16, the inlet valve 27 closes. By means of the pressure controller 16, a substantially constant operating pressure downstream of the pressure controller 16 can thus be adjusted.

In the flow direction toward the internal combustion engine 11, a fuel line 66 is connected at the control chamber 31. In the embodiment, at the outlet of the control chamber 31 a filter 35 is provided through which the fuel flows into the fuel line 66. Downstream of the control chamber 31, a first check valve 36 and a second check valve 37 are arranged in the fuel line 66. At a location between the check valves 36 and 37, the connecting opening 77 (FIG. 4) of the manually actuatable feed pump 17 opens into the fuel line 66. The operating pump 15, the pressure controller 16, and the feed pump 17 are arranged in the embodiment in a common pump housing 14 and form together the unit which is referred to as fuel pump 9.

Downstream of the second check valve 37, the fuel system comprises a pressure damper 18. The pressure damper 18 is arranged immediately adjacent to a fuel valve 19 that supplies the fuel into the crankcase 12 of the internal combustion engine 11. The pressure damper 18 dampens fluctuations of the fuel pressure. The internal combustion engine 11 comprises a cylinder 13. It can also be provided that the fuel valve 19 supplies the fuel into the cylinder 13, a transfer passage of the internal combustion engine 11, or an intake channel of the internal combustion engine 11. The pressure damper 18 comprises a damping chamber 38 into which the fuel line 66 opens. The damping chamber 38 is delimited by a damping diaphragm 39 separating the damping chamber 38 from a back chamber 40. In the embodiment, the back chamber 40 is loaded with ambient pressure. A different reference pressure for the back chamber 40 can however also be provided. The damping diaphragm 39 in the embodiment is pretensioned by a spring 41. The spring 41 is advantageously designed for the operating pressure in the fuel system. In the embodiment, the spring 41 is arranged in the back chamber 40. Downstream of the fuel valve 19, an overpressure valve 20 is provided by means of which fuel that has not been supplied into the internal combustion engine 11 can flow back from the fuel valve 19 through a return line 82 into the fuel tank 8.

Prior to starting the internal combustion engine 11, the operator advantageously actuates the feed pump 17. By suppressing the primer bulb 10, fuel is forced from the control chamber 31 to the pressure damper 18 and to the fuel valve 19. Since the fuel valve 19 is closed, the fuel flows through the overpressure valve 20 via the return line 80 back into the fuel tank 8. As the pressure in the control chamber 31 drops, the inlet valve 27 opens and fuel is sucked in via the operating pump 15 through the fuel line 79 from the fuel tank 8. By actuating the feed pump 17, the entire fuel system can thus be flushed. Since the feed pump 17 is arranged downstream of the pressure controller 16, the pressure controller 16 does not limit the operating pressure that is supplied by the feed pump 17. In this way, the pressure damper 18 and the fuel valve 19 can be flushed with fuel at a pressure that is increased relative to the operating pressure. The pressure at which the fuel valve 19 is flushed is advantageously determined by the overpressure valve 20. The operating pressure of the fuel system is advantageously an overpressure of 0 bar to 2 bar relative to ambient pressure. This fuel pressure is adjusted in operation by the pressure controller 16.

Figure 3:
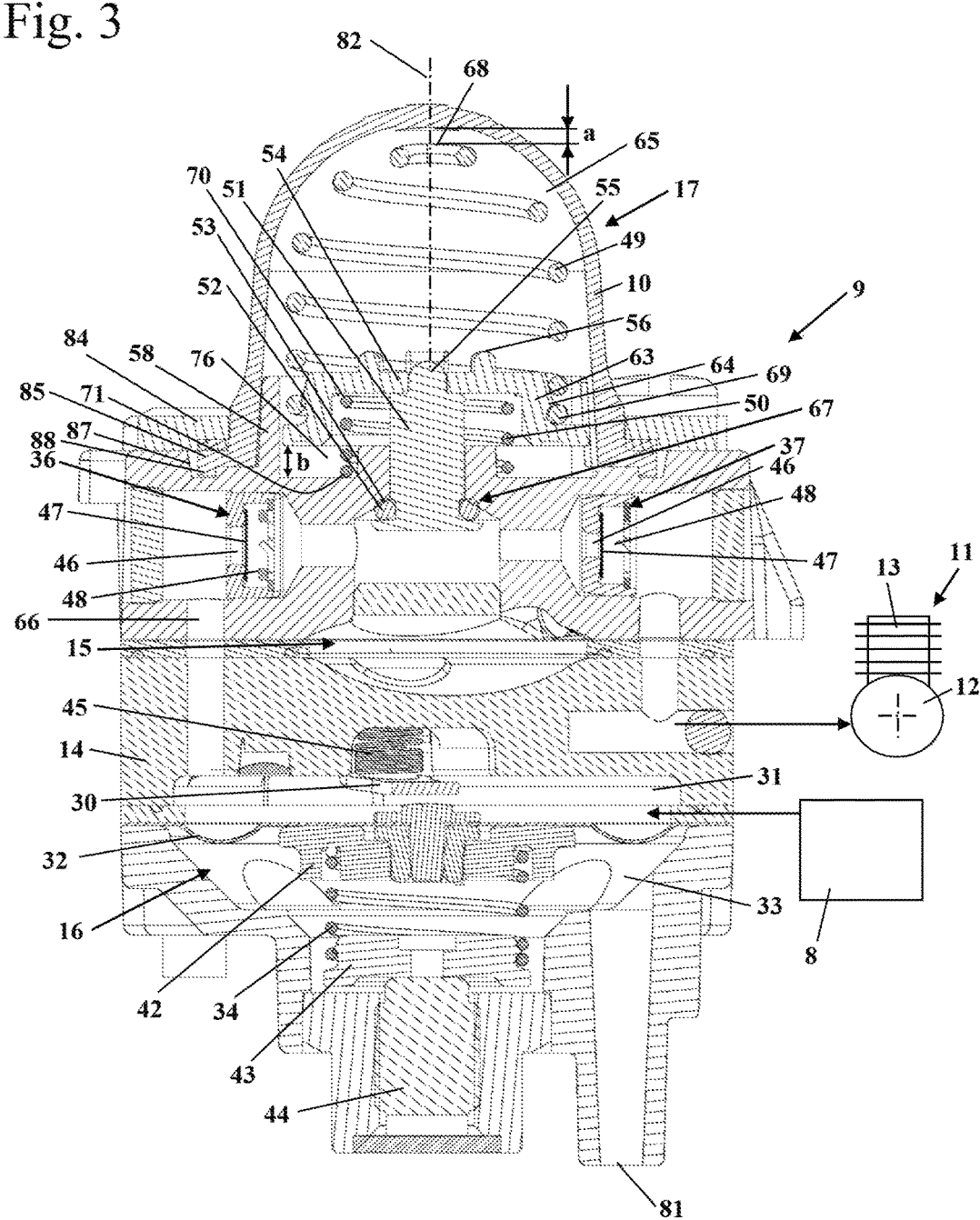
FIG. 3 is a section illustration of the fuel pump of the fuel system with schematic illustration of the arrangement of the fuel pump in the fuel system.

FIG. 3 shows the configuration of the fuel pump 9 in detail. In the illustration of FIG. 3, the configuration of the operating pump 15 is not shown in detail. In the pump housing 14, the control diaphragm 32 of the pressure controller 16 is secured between two housing sections. Fuel is supplied from the fuel tank 8 to the control chamber 31. The supply of fuel into the control chamber 31 is not visible in the section illustration of FIG. 3 and is only schematically shown. As illustrated in FIG. 3, the lever 30 is pretensioned by a second pretensioning spring 45. The control valve 28 is advantageously arranged in the area of the second pretensioning spring 45. The back chamber 33 is connected by a compensation opening 81 with the ambient. It is also possible to apply a different pressure at the compensation opening 81. For example, the compensation opening 81 can be connected to a clean chamber of an air filter of the internal combustion engine 11. In the back chamber 33, the first pretensioning spring 34 is arranged which pretensions the control diaphragm 32. The first pretensioning spring 34 is supported with one end on a first support plate 42 which is secured on the control diaphragm 32. The pretension of the first pretensioning spring 34 is adjustable. For this purpose, a second end of the first pretensioning spring 34 is supported on a second support plate 43 which is supported on an adjusting screw 44. By means of the adjusting screw 44, the position of the second support plate 43 and thus the pretension of the first pretension spring 34 can be adjusted.

The fuel line 66 extends away from the control chamber 31 and is formed by bores in the pump housing 14. In the flow direction from the control chamber 31 to the internal combustion engine 11, a first check valve 36 is arranged which opens in flow direction toward the internal combustion engine 11. The first check valve 36 comprises an opening 46 which is closed by a valve plate 47 in the closed position of the first check valve 36 illustrated in FIG. 3. The valve plate 47 can lift off the opening 46 until it contacts the stop 48. In this position of the valve plate 47, the first check valve 36 is open. As shown in FIG. 3, the valve plate 47 is arranged so as to float freely between opening 46 and stop 48. A pretensioning spring which pretensions the valve plate 47 in one direction is not provided.

Downstream of the first check valve 36, a travel-controlled valve 67 opens into the fuel line 66. Downstream of the opening of the travel-controlled valve 67, the second check valve 37 is arranged that is constructively identical to the first check valve 36 and also comprises an opening 46, a valve plate 47, and a stop 48.

The travel-controlled valve 67 is part of the feed pump 17. The first check valve 36 and the second check valve 37 are also part of the feed pump 17. The feed pump 17 comprises the primer bulb 10. In the primer bulb 10, a first spring 49 is arranged. The first spring 49 is advantageously designed as a coil pressure spring. The outer diameter of the first spring 49 is adjusted to the contour of the primer bulb 10 and decreases with increasing spacing from the pump housing 14. The radial spacing of the first spring 49 to the primer bulb 10 in radial direction to a longitudinal center axis 82 of the primer bulb 10 is approximately constant across the length of the spring 49. Accordingly, an approximately conical or dome-shaped form of the first spring 49 results. The first spring 49 is positioned in the non-actuated state of the primer bulb 10 with its first spring end 68 facing the crest of the primer bulb 10 at a spacing a relative to the inner wall of the primer bulb 10. The spacing a can be, for example, a few millimeters and prevents that the primer bulb 10, even in case of an unfavorable tolerance position, will contact the first spring 49 in the non-activated state. When the primer bulb 10 is suppressed, the primer bulb 10 contacts the first spring 49 and acts immediately on the first spring 49.

The second spring end 69 of the first spring 49 is facing the pump housing 14. The second spring end 69 is supported on an intermediate element 54. In the embodiment, the first spring end 69 is guided on the outer circumference of a guide element 63 of the intermediate element 54. The guide element 63 is formed as a guide socket in the embodiment. The first spring 49 is matched to the outer diameter of the intermediate element 54 such that the first spring 49 is frictionally secured against rotation on the intermediate element 54. The forces that are acting in operation between intermediate element 54 and first spring 49 therefore cannot rotate the first spring 49 relative to the intermediate element 54. In axial direction, the second spring end 69 of the first spring 49 is secured on a locking rim 64 of the guide element 63. The second spring end 69 of the first spring 49 engages from behind the locking rim 64 in the direction of the longitudinal center axis 82 of the primer bulb 10 and is therefore secured with form fit on the intermediate element 54.

In the embodiment, the intermediate element 54 has a circular cross-section. Any other cross-section for the intermediate element, for example, a rectangular or elliptical cross-section, can however also be advantageous. In the embodiment, the intermediate element is formed as a support plate.

The intermediate element 54 is movably guided in the direction of the longitudinal center axis 82 on the pump housing 14. On the side which is opposite the first spring 49, a second spring 50 is supported on the intermediate element 54. The second spring 50 is supported with a first spring end 70 on the intermediate element 54. The first spring end 70 of the second spring 50 is positioned so as to face the first spring 49. The second spring 50 is supported with a second spring end 71 on the topside of the pump housing 14. The second spring end 71 of the second spring 50 is facing the pump housing 14. The second spring 50 is also designed preferably as a coil pressure spring.

In the embodiment, the second spring 50 has a constant outer diameter which is smaller than the largest outer diameter of the first spring 49. The spring constant of the second spring 50 is advantageously greater than that of the first spring 49. Advantageously, the spring constant of the second spring 50 is at least 1.1 times, in particular at least 1.2 times, preferably approximately 1.3 times, the spring constant of the first spring 49. In the embodiment, the different spring constants are the result of the different outer diameters and wire cross-sections of the springs 49 and 50.

A valve member 51 is secured on the intermediate element 54. The valve member 51 comprises a connecting element 55 that projects into an opening of the intermediate element 54 and is secured fixedly in the opening. Preferably, the connecting element 55 is welded (fused) to the intermediate element 54. A different connecting technology can however also be advantageous. In the embodiment, the connecting element 55 is designed as a connecting pin.

The valve member 51 supports a seal 52 on the side which is neighboring the fuel line 66; the seal 52 is contacting a valve seat 53 formed on the pump housing 14 and, in this way, closes off the pump chamber 65 enclosed by the primer bulb 10 relative to the fuel line 66. The seal 52 is secured on the valve member 51 by a plate 83 of the valve member 51 (see FIG. 4). As is shown in FIG. 3, a further chamber 76 is formed between the intermediate element 54 and the pump housing 14. Fuel flows through the chamber 76 when the fuel is flowing from the pump chamber 65 into the fuel line 66 or is flowing in the opposite direction.

The valve is a travel-controlled valve 12. The chamber 76 is connected with the fuel line 66 by means of the connecting opening 77 (FIG. 4) which is closed in FIG. 3. The connecting opening 77 is opened when the valve member 51 in FIG. 3 is moved downwardly, i.e., away from the pump chamber 65, in the direction toward the pump housing 14.

For this purpose, the operator must suppress the primer bulb 10. When the primer bulb 10 is suppressed, first the primer bulb 10 will contact the first spring end 68 of the first spring 49. Upon further actuation movement of the primer bulb 10, the first spring 49 moves the intermediate element 54 against the force of the second spring 50 in the direction of the fuel line 66.

The movement of the intermediate element 54 is realized because the spring constant of the second spring 50 is smaller than that of the first spring 49. As the intermediate element 54 moves together with the valve member 51, the connecting opening 77 is opened. The connecting opening 77 is the opening that is closed when the valve 67 is closed by the valve member 51 and through which, when the valve 67 is opened, liquid can flow, the liquid being fuel in the embodiment. As is shown in FIG. 3, the intermediate element 54 can be moved by actuation travel b which in the embodiment corresponds to the spacing between the intermediate element 54 and the exterior side of the pump housing 14.

Figure 4:
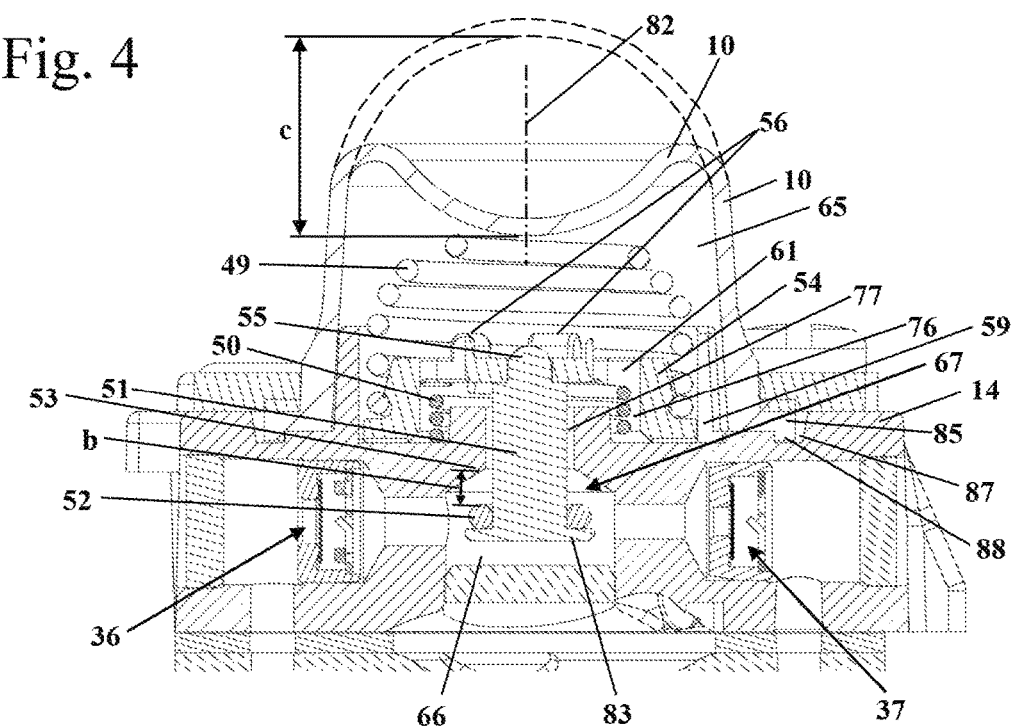
FIG. 4 is a sectioned detail illustration of the fuel pump with actuated primer bulb.

FIG. 4 shows the valve 67 in the open state. The valve member 51 has opened the connecting opening 77. FIG. 4 shows the first spring 49, the intermediate element 54, and the valve member 51 in a position rotated about longitudinal center axis 82 relative to the illustration in FIG. 3. This section view illustrates that the valve member 51 is provided at its outer circumference with flattened portions (see also FIG. 6) that form the connecting opening 77.

FIG. 3 shows the primer bulb 10 in non-activated position. FIG. 4 shows the primer bulb 10 in actuated position. In the actuated state, the primer bulb 10 is suppressed relative to the non-actuated position illustrated in FIG. 3 by actuation travel c. When suppressing the primer bulb 10, first the first spring 49 is compressed until the force of the first spring 49 is sufficient in order to compress the second spring 50. Upon further suppression of the primer bulb 10, the intermediate element 54 is moved together with the valve member 51 by the actuation travel b until the intermediate element 54 contacts the pump housing 14. In FIG. 4, the actuation travel b is shown as a spacing of the seal 52 to the valve seat 53. Upon further suppression of the primer bulb 10, the first spring 49 is further compressed. The actuation travel c of the primer bulb 10 amounts advantageously to at least two times, in particular at least four times, the actuation travel b of the valve member 51. In the embodiment, the actuation travel c amounts to more than five times the actuation travel b. When suppressing the primer bulb 10, the volume of the pump chamber 65 decreases. In this way, fuel from the pump chamber 65 is forced via through passages 61 (FIG. 7) in the intermediate element 54 into the chamber 76 and from there via the connecting opening 77 into the fuel line 66. The first check valve 36 is closed in this context and the second check valve 37 is open so that fuel can flow in the direction toward the internal combustion engine 11.

When the suppressed position of the primer bulb 10 illustrated in FIG. 4 is released, the first spring 49 returns (restores) the primer bulb 10. At the same time, the second spring 50 moves the intermediate element 54 into its initial position and closes thereby the connecting opening 77. As the primer bulb 10 is restored due to its elasticity and returned into its non-actuated position, the volume of the pump chamber 65 is increased so that fuel is sucked in through the first check valve 36 from the fuel line 66 through the connecting opening 77, the chamber 76, and the through passages 61 into the pump chamber 65. The second check valve 37 is closed in this context so that no fuel can be sucked back into the feed pump 17. The connecting opening 77 forms the inflow opening into the pump chamber 65 as well as the outflow opening out of the pump chamber 65. The fuel does not flow immediately into the pump chamber 65 but first into the chamber 76 or flows first from the pump chamber 65 into the chamber 76 and then flows out. The liquid, in the embodiment fuel, is sucked in due to the restoring action of the primer bulb 10.

FIG. 4 shows the primer bulb 10 in the usual actuation position. When the operator suppresses the primer bulb 10 even further, the primer bulb 10 can come into contact with the intermediate element 54. Advantageously, stops 56 are provided at the topside of the intermediate element 54. The stops 56 are embodied as rounded stays or webs. The stops 56 are advantageously arranged around the connecting element 55. In this way, contact of the primer bulb 10 with the connecting element (connecting pin) 55 is avoided. When the connecting element 55 has been welded or fused to the intermediate element 54, sharp edges may have formed on the connecting element 55. Due to the stops 56, contact of the primer bulb 10 with possibly present sharp edges of the connecting element 55 is reliably prevented.

Figure 5:
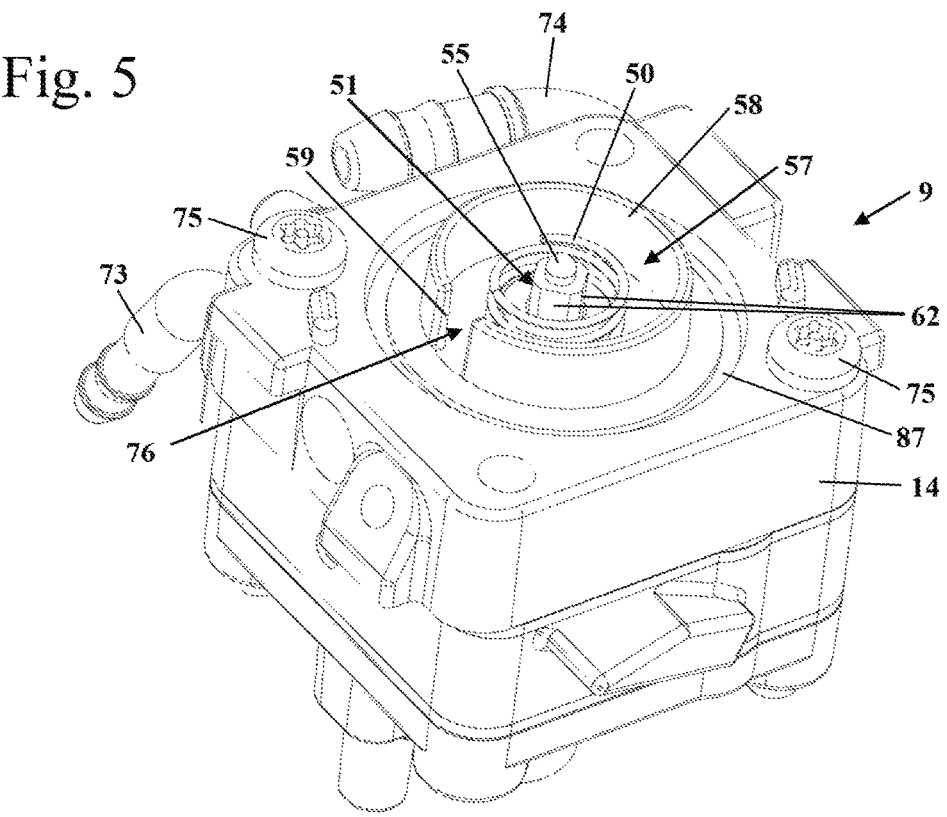
FIG. 5 is a perspective illustration of the fuel pump with demounted primer bulb, demounted first spring, and demounted intermediate element.

FIG. 5 shows the configuration of the chamber 76 in detail. The chamber 76 in the embodiment is formed in a receptacle 57 provided on an exterior side of the pump housing 14. The receptacle 57 is surrounded by a cylindrical wall 58. A guide groove 59 is formed in the cylindrical wall 58. The guide groove 59 is formed as a perforation of the cylindrical wall 58 and extends in the direction of the longitudinal center axis 82. The guide groove 59 is also shown in FIG. 4 in section. The second spring 50 is arranged in the chamber 76.

Figure 6:
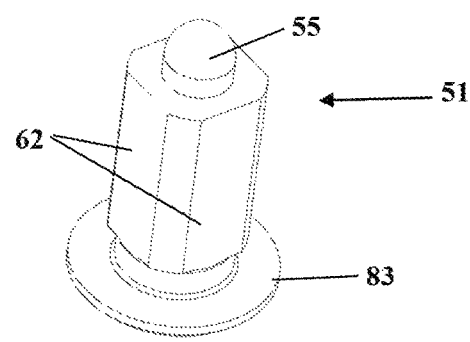
FIG. 6 is a perspective illustration of the valve member of the fuel pump.

In FIG. 5, the valve member 51 is also illustrated; in the embodiment, it has a total of four flattened portions 62 distributed about the circumference (see FIG. 6). The valve member 51 is guided in an opening with circular cross-section in the pump housing 14. Due to the flattened portions 62, a through passage is formed between the wall of the circular opening and the outer circumference of the valve member 51 providing the connecting opening 77. In the embodiment, the through passage is comprised of four partial passages along the sides of the valve member 51. As is shown in FIG. 5, the individual parts of the pump housing 14 are connected to each other by screws 75. On the pump housing 14, an intake socket 73 is arranged, which is serving for connecting the pump housing 14 to the fuel tank 8, as well as a connecting socket 74, which serves for connecting the pump housing 14 to the pressure controller 16 and the fuel valve 19 (FIG. 2).

The wall 58 is resting against the inner side of the primer bulb 10, as illustrated in FIG. 3. The primer bulb 10 comprises an outwardly projecting securing rim 85. On the pump housing 14, a holder 84 is secured on the exterior side of the primer bulb 10 by means of which the securing rim 85 of the primer bulb 10 is clamped on the pump housing 14. The wall 58 prevents the primer bulb 10 from deforming elastically inwardly and from thereby sliding out from underneath the holder 84. At the same time, the wall 58 increases the stability of the primer bulb 10 in the area in which the intermediate element 54 is arranged. As also shown in FIG. 3, the securing rim 85 comprises advantageously a rim 88 which is projecting toward the pump housing 14. The rim 88 in the embodiment is designed as a circumferentially extending ring and projects into an annular groove 87 on the topside of the pump housing 14. The groove 87 is also shown in FIG. 5.

In FIG. 6, the valve member 51 is shown in detail. The four flattened portions 62 form in the embodiment a rectangular cross-section with rounded corners. On the side that is projecting into the fuel line 66 (FIG. 3), the valve member 51 is provided with plate 83 on which the seal 52 (FIGS. 3 and 4) is secured.

Figure 7:
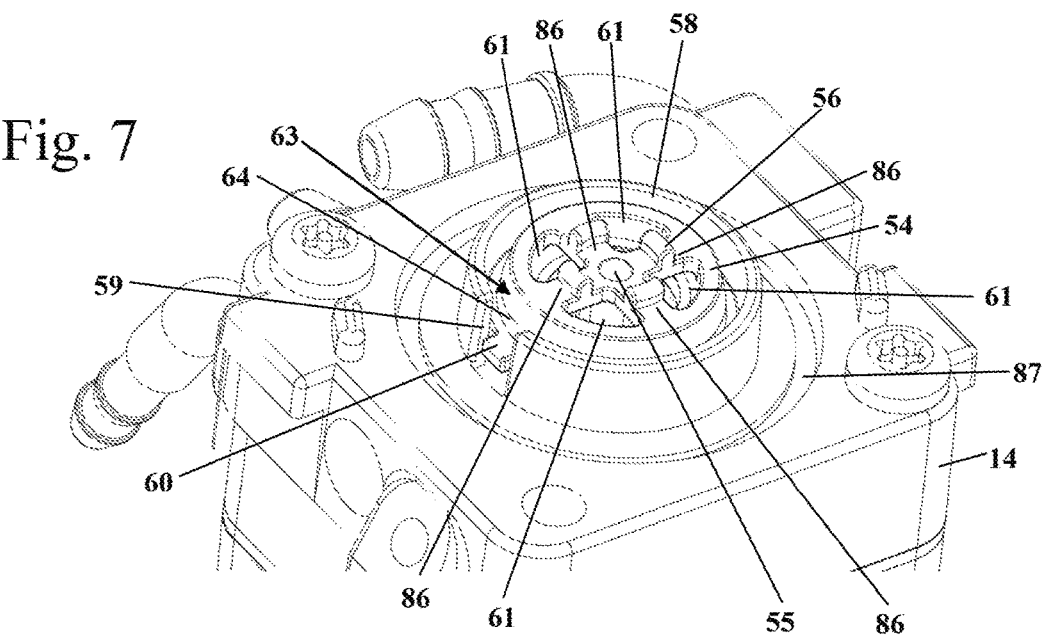
FIG. 7 is a perspective detail illustration of the fuel pump with demounted primer bulb and demounted first spring.

FIG. 7 shows the pump housing 14 with the intermediate element 54. The intermediate element 54 comprises preferably a total of four through passages 61 that are separated from each other by webs 86. On each web 86, a stop 56 is formed. The intermediate element 54 comprises a guide nose 60 which projects into the guide groove 59. In the embodiment, the guide nose 60 projects radially outwardly away from the guide element (guide socket) 63. The guide groove 59 and the guide nose 60 form a form-fit anti-rotation securing action for the intermediate element 54. In FIG. 7, the locking rim 64 is also shown on which the first spring 49 is secured in the direction of the longitudinal center axis 82 on the intermediate element 54. The intermediate element 54 is configured as a plate in the embodiment.

Figure 8:
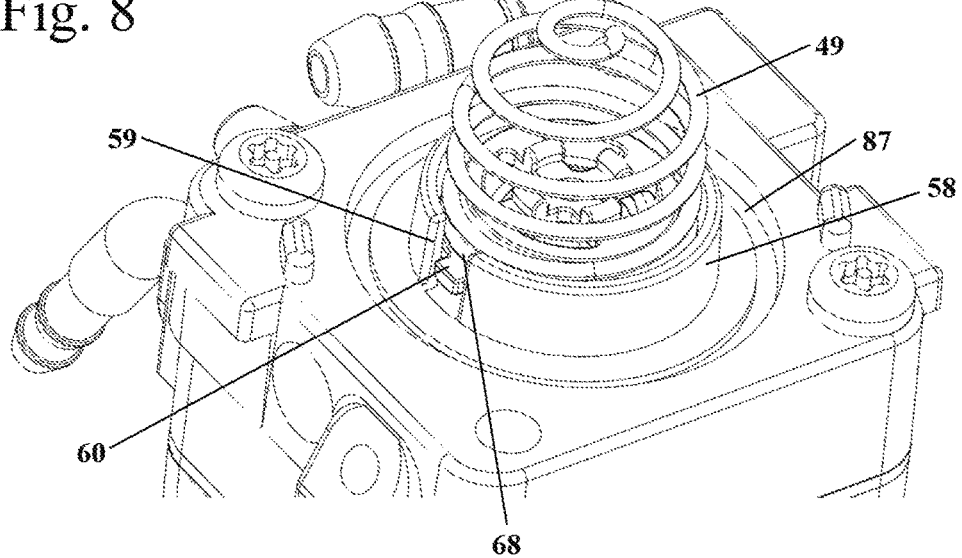
FIG. 8 is a perspective detail illustration of the fuel pump with demounted primer bulb.

FIG. 8 shows the first spring 49 arranged on the intermediate element 54. As shown in FIG. 8, the first spring end 68 of the first spring 49 is arranged also within the wall 58, i.e., within the receptacle 57.

In the embodiment, the first spring 49 and the second spring 50 are additional elements made of steel. However, it can also be provided that the first spring 49 and/or the second spring 50 are made of plastic material. The first spring 49 and/or the second spring 50 can also be formed integrally on another component.

It can be particularly provided that the second spring 50 is integrally formed on the pump housing 14 or on the intermediate element 54. Preferably, the second spring 50 is formed by one or a plurality of plastic elements which are integrally formed on the intermediate element 54. The first spring 49 is supported with its first spring end 68 on the primer bulb 10 and with its second spring end 69 relative to the valve member 51.

The specification incorporates by reference the entire disclosure of German priority document 10 2015 016 484.8 having a filing date of Dec. 15, 2015.

While specific embodiments of the invention have been shown and described in detail to illustrate the inventive principles, it will be understood that the invention may be embodied otherwise without departing from such principles.

What is claimed is:

1. A manually actuated feed pump comprising:
   a primer bulb configured to be manually actuated by an operator, wherein the primer bulb comprises a pump chamber;
   a travel-controlled valve connecting the pump chamber to a fuel line;
   wherein the travel-controlled valve comprises a valve member, wherein the valve member is moved by an actuation travel of the primer bulb into an open position that opens the travel-controlled valve;
   a first spring operatively connected to the valve member and to the primer bulb, wherein the primer bulb acts through the first spring on the valve member.

2. The feed pump according to claim 1, wherein the primer bulb acts immediately on the first spring.

3. The feed pump according to claim 2, wherein the first spring is secured against rotation relative to the primer bulb.

4. The feed pump according to claim 1, wherein the first spring in a non-actuated state of the primer bulb has a spacing relative to the primer bulb.

5. The feed pump according to claim 1, wherein the actuation travel of the primer bulb amounts to at least two times an actuation travel of the valve member for moving the valve member into the open position.

6. The feed pump according to claim 1, further comprising a second spring, wherein the second spring is acting on the valve member in a closing direction of the travel-controlled valve.

7. The feed pump according to claim 6, wherein a spring constant of the second spring is greater than a spring constant of the first spring.

8. The feed pump according to claim 6, further comprising an intermediate element, wherein the valve member is secured on the intermediate element.

9. The feed pump according to claim 8, wherein the intermediate element is arranged between the first spring and the second spring.

10. The feed pump according to claim 8, wherein the first spring and the second spring are supported on the intermediate element, respectively.

11. The feed pump according to claim 8, wherein the intermediate element comprises at least one through passage connecting the pump chamber with a chamber that is formed between the intermediate element and a pump housing of the feed pump.

12. The feed pump according to claim 8, wherein the intermediate element is arranged in a receptacle of a pump housing of the feed pump, wherein the receptacle is formed by a wall and the wall is contacting an inner side of the primer bulb.

13. The feed pump according to claim 1, wherein the first spring is a pressure spring.

14. The feed pump according to claim 1, wherein the travel-controlled valve comprises at least one connecting opening that is controlled by the travel-controlled valve, wherein the at least one connecting opening connects the fuel line and the pump chamber, wherein the at least one connecting opening forms an inflow opening into the pump chamber and an outflow opening from the pump chamber.

15. A fuel system comprising a feed pump according to claim 1, wherein a pressure in the fuel system amounts to an overpressure of 0 bar to 2 bar relative to ambient pressure.

* * * * *